United States Patent
Xu et al.

(10) Patent No.: US 12,499,748 B2
(45) Date of Patent: Dec. 16, 2025

(54) INTEGRATED PERSONAL SAFETY SYSTEM AND METHOD OF USING THE SAME

(71) Applicants: Cheng Eric Xu, Shanghai (CN); Chenyu Jason Chou, Sichuan (CN); Juncheng Ryan Bian, Beijing (CN); Ke Cleo Xu, Beijing (CN); Liangxi Nick Chen, Brooklyn, NY (US); Lisa Rousha Wang, Belle Mead, NJ (US); Jian Jim Wang, Belle Mead, NJ (US)

(72) Inventors: Cheng Eric Xu, Shanghai (CN); Chenyu Jason Chou, Sichuan (CN); Juncheng Ryan Bian, Beijing (CN); Ke Cleo Xu, Beijing (CN); Liangxi Nick Chen, Brooklyn, NY (US); Lisa Rousha Wang, Belle Mead, NJ (US); Jian Jim Wang, Belle Mead, NJ (US)

(*) Notice: Subject to any disclaimer, the term of this patent is extended or adjusted under 35 U.S.C. 154(b) by 148 days.

(21) Appl. No.: 18/202,887

(22) Filed: May 27, 2023

(65) Prior Publication Data
US 2024/0395127 A1 Nov. 28, 2024

(51) Int. Cl.
G08B 25/01 (2006.01)
G01C 21/34 (2006.01)

(52) U.S. Cl.
CPC ....... *G08B 25/016* (2013.01); *G01C 21/3461* (2013.01)

(58) Field of Classification Search
CPC ........................... G08B 25/016; G01C 21/3461
USPC .......................................................... 340/521
See application file for complete search history.

(56) References Cited

U.S. PATENT DOCUMENTS

| | | | | |
|---|---|---|---|---|
| 9,820,120 B2* | 11/2017 | deCharms | ............... | H04W 4/02 |
| 9,852,599 B1* | 12/2017 | Slavin | ...................... | A61B 7/04 |
| 9,930,257 B2 | 3/2018 | Blum et al. | | |
| 2014/0118140 A1* | 5/2014 | Amis | ..................... | G08B 25/08 |
| | | | | 340/539.13 |
| 2015/0110285 A1* | 4/2015 | Censo | .................... | B60Q 5/006 |
| | | | | 381/86 |
| 2016/0358080 A1* | 12/2016 | Blanco | ................. | G08B 15/007 |
| 2017/0018193 A1* | 1/2017 | Gordon | ............. | G01C 21/3492 |
| 2017/0052561 A1 | 2/2017 | Proksch | | |
| 2021/0103738 A1* | 4/2021 | Buerkle | ................. | G06V 20/52 |
| 2024/0192009 A1* | 6/2024 | Araujo | ................. | B64C 39/024 |
| 2024/0395127 A1* | 11/2024 | Xu | ......................... | G08B 31/00 |

FOREIGN PATENT DOCUMENTS

KR 20210084780 A 7/2021

* cited by examiner

*Primary Examiner* — Naomi J Small
(74) *Attorney, Agent, or Firm* — Treasure IP Group, LLC (57) ABSTRACT

An integrated real-time personal safety system, described herein, is a holistic solution designed to enhance user safety through proactive hazard detection and alerts. This system comprises a data collection unit that features a sensor-embedded wearable device and a set of environmental and physiological sensors, providing comprehensive coverage of the user's surroundings and health status. Aided by wireless communication modules, the system ensures seamless transmission of real-time data to cloud-based services for analysis. The system's processing unit leverages this data to predict potential threats and initiates the signal alert unit to promptly notify the user through visual, auditory, or haptic cues. By bridging the gap between data collection, analysis, and user alert, the system ensures a proactive response to potential hazards.

18 Claims, 10 Drawing Sheets

INTEGRATED PERSONAL SAFETY SYSTEM AND METHOD OF USING THE SAME

TECHNICAL FIELD

The disclosed embodiments relate generally to a data gathering, data transfer, data analysis and alert device, more particularly, to wearable devices that can detect hazards and send alert to users.

BACKGROUND

The current understanding of personal safety during vehicular travel or outdoor activities, such as hiking, is primarily subjective, influenced by personal experiences rather than solid, empirical data. This deficiency in data-driven safety awareness became tragically evident when a mother participating in a Boy Scout hike in Santa Clara, California, was suddenly struck and killed by a falling tree. Similarly, a group of students visiting a school campus sustained severe injuries due to an unexpected tree fall. These incidents highlight that conventional judgment, such as a seasoned hiker deeming a familiar path safe or a campus visitor not anticipating arboreal hazards, can be fatally flawed.

Beyond such environmental risks, personal safety also encompasses the unpredictability of human behavior. A grievous incident in China illustrates this concern vividly: pedestrians, crossing the road with the assurance of a green traffic signal, were fatally struck by a distressed driver.

The aforementioned incidents underscore the unpredictability inherent in personal safety, highlighting the pressing need for safety systems that are informed by empirical data and real-time analytics.

Further complicating matters, even when individuals are sober, informed, and aware, decision-making during critical moments can have severe implications. For instance, a motorist in Florida, despite exhibiting situational awareness and empathy for wildlife, caused a major multi-vehicle collision when they halted abruptly on a busy highway to let a turtle cross.

This accident, involving a variety of vehicles such as a pickup truck, a semi-truck, and numerous other cars, unfolded on a Tuesday morning on U.S. Route 331, as documented by the Walton County Sheriff's Office.

The Sheriff's Office, while appreciating the driver's intent to protect wildlife, stressed that such actions should not compromise road safety, particularly on high-traffic roads. This incident underscores the urgent need for a system that aids individuals in making safer, more informed decisions in real-time to avoid unintended and potentially hazardous outcomes.

In view of the foregoing, there is a need for personal safety system which is date driven, provide situational awareness and aid in decision making in critical life moments.

SUMMARY OF THE INVENTION

The object of the present invention is to develop an integrated real-time personal safety system designed to enhance the safety and awareness of a user in various environments and situations. This system operates through a dynamic and synergistic combination of multiple components, meticulously designed to collect, analyze, and send alert to a user to a multitude of source of data in real-time.

Another object of the present invention is to develop a robust, integrated personal information system is unmistakable. Such a system should not only facilitate instantaneous data collection and processing but also ensure comprehensive sharing of situational awareness for individuals at all times, involving decision intervene when it is deemed proper.

On a first aspect of the invention, the integrated real-time personal safety system comprises a data collection unit, data analysis and processing unit and signal alert unit. The data collection unit communicate with data analysis and processing unit through wireless communication modules.

Data collection unit further comprises personal wearable devices, target location environmental sensors. Additionally, data collection unit is configured to gather information from various sources including but not limited to public private CCTV, data from public systems like traffic lights, date from law enforcement and emergency service and information from social medial, news reports about the current event.

The data collection unit is configured to collect real-time data from multiple sources. It incorporates a wearable device furnished with multiple cameras that capture real-time data across various spectral bands. This wearable device can be seamlessly integrated into various items, including but not limited to hats, glasses, watches, bags, belts, clothing items, and jewelry. To provide complete situational awareness, these cameras deliver a 360-degree coverage of the user's surroundings and are further equipped with night vision and thermal imaging capabilities.

The data collection unit is further designed to gather broader situational information from public systems such as traffic lights, data from law enforcement and emergency services, social media feeds, news reports, and even public and private CCTV feeds. This approach enhances the user's awareness of their surroundings by providing a broader context beyond what the wearable device can observe directly.

A set of sensors embedded within the system monitor both the user's environment and physiological signals. Environmental sensors measure variables such as temperature, humidity, and air quality, while biometric sensors monitor user-specific parameters, including heart rate and blood oxygen levels.

Optionally or preferably, data collection unit comprises a compact personal drone system. The compact personal drone is equipped with a high-resolution camera and microphone, and can be stationed on or detached from the user's car, wearable device, or shoulder when not in use. The compact personal drone provides aerial information, enhancing the user's perception of their surroundings.

The system also features wireless communication modules that enable real-time communication with cloud-based services, the wearable device, and the user. This wireless connectivity allows for continuous data transmission and immediate updates on any potential hazards.

The data analysis and processing unit of the system utilizes all of this collected data. It estimates the likelihood of various hazards, detects anomalies, and continuously refines its predictive models based on past predictions. Additionally, the unit ensures strict privacy and security measures, including data anonymization, secure data transmission and storage, and strict access controls.

The personal safety system further comprises the signal alert unit, configured to notify the user based on predetermined criteria such as proximity, urgency, relevance, or personal preferences. The alert unit can communicate with other integrated personal safety systems, sharing relevant data and alerts between users. This allows for a collective situational awareness and, potentially, a faster response to developing hazards.

Further, the system is designed to integrate seamlessly with public systems, law enforcement, and emergency services to provide timely and comprehensive alerts about potential hazards. It also has an autopilot alert system to warn the user of potential hazards that a vehicle's autopilot system may not recognize or respond to appropriately. It can further collect data about the user's driving behavior and vehicle status via a vehicle telematics system, providing alerts and interventions for safer driving.

Furthermore, as exemplified by the unfortunate incident in Florida, the system can offer much-needed assistance during complex decision-making moments. In circumstances where it might be hazardous to abruptly halt a vehicle, such as for wildlife crossing a busy road, the system could leverage real-time data to present the driver with safer alternatives. It could also alert nearby vehicles of the situation via vehicle-to-vehicle (V2V) communication to prevent cascading incidents.

This advanced system could potentially prevent scenarios like the one on U.S. Route 331, where a well-meaning action led to unintended chaos. The system's ability to quickly process complex data about the surroundings, vehicle status, and potential hazards, and then communicate this information to the driver and surrounding vehicles, significantly enhances decision-making accuracy and safety.

In addition, this technology could even interact with wildlife protection systems or local wildlife authorities. For example, in the Florida case, it could have relayed the turtle's location to a relevant organization capable of ensuring the turtle's safe passage without causing traffic disruption.

This integration of a personal information system with larger public systems exemplifies a new level of situational awareness and safety precaution. In turn, it could significantly reduce the risk of accidents due to abrupt decisions, misinformation, or lack of awareness, thereby increasing overall road safety and personal security.

It is evident that the integration of real-time data analysis, seamless inter-device communication, and the ability to link with larger public safety systems has the potential to revolutionize personal safety. It provides a comprehensive, informed safety mechanism that places users in an advantageous position when faced with unpredictable situations or immediate threats, whether they're on a busy highway or exploring remote trails.

Further, the integrated real-time personal safety system includes a user feedback mechanism to improve the predictive models and alert protocols based on user experiences. A built-in GPS module for real-time tracking of the user's location enhances the overall user safety by maintaining an updated location record.

On a second aspect of the present invention, a method of using the integrated personal safety system.
  providing the personal safety system described system, signing up for a personal security service, downloading an APP and synchronizing the APP with the wearable device; passively monitoring the data from various sources based on location or target location information over time. If it detects a potential hazard, it sends an alert to the user's smartphone or wearable device, suggesting actions for the user to take. Users can then review this information and decide on the best course of action.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Figure 1:
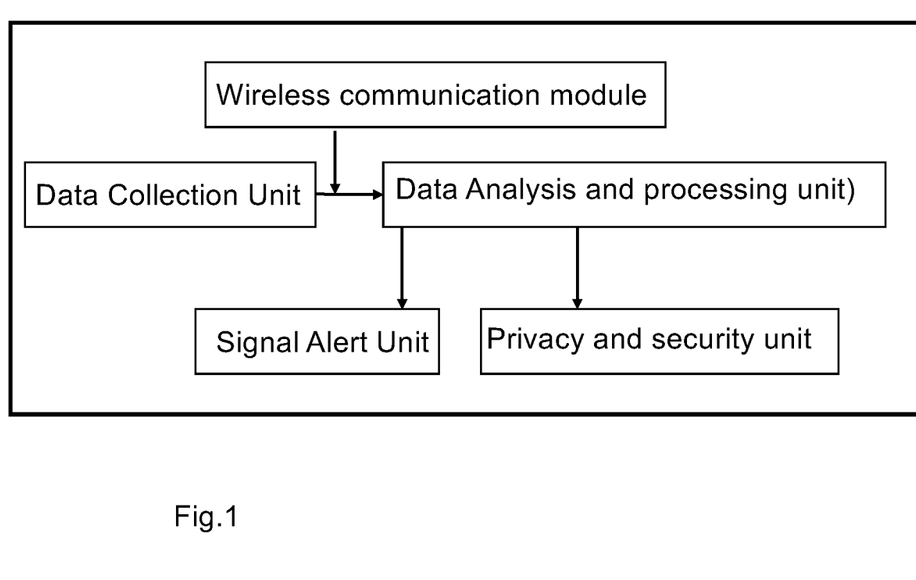
FIG. 1 is a schematic illustration of the components of the real-time personal safety system in accordance with the aspects of the present invention.

The system in question is an integrated real-time personal safety system designed with a user's comprehensive security in mind. Referring to FIG. 1, it comprises data collection unit, data analysis unit, signal alert unit and privacy and security unit. The data collection unit is designed to gather real-time current condition information from multiple sources. Central to data collection unit is a wearable device embedded with a multitude of cameras, capturing real-time data across various spectral bands. This wearable device can take several forms, including hats, glasses, watches, bags, belts, clothing items, and jewelry, allowing for versatile use across different scenarios and user preferences. The customizable design means the system can be adapted to the user's needs and lifestyle. The wearable device provides 360-degree or even 720-degree coverage of the user's surroundings, making it an essential tool for comprehensive situational awareness. It is also equipped with night vision and thermal imaging capabilities, ensuring functionality even in low-light conditions or challenging weather situations.

Figure 2:
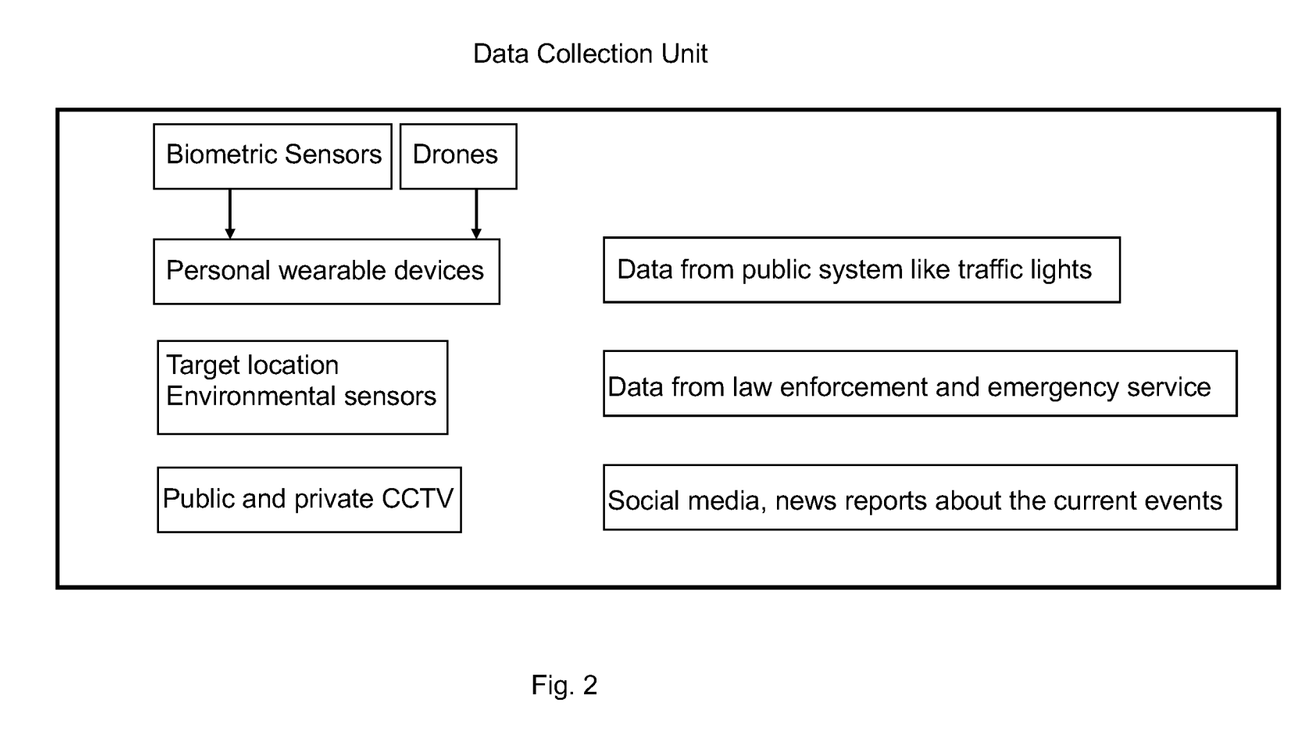
FIG. 2 is a schematic illustration of the components of the data collection unit of the real-time personal safety system in accordance with the aspects of the present invention.

The data collection unit also comprises a set of sensors to monitor both the user's environment and physiological signals. These include biometric sensors like heart rate and blood oxygen level sensors, which monitor the user's physiological status, and environmental sensors like temperature, humidity, and air quality sensors that observe both the current and target locations. Additionally, motion sensors aid in detecting movements in the user's surroundings, improving the system's ability to foresee potential threats or hazards. The seamless integration of all these components into a single wearable device provides users with a comprehensive view of their surroundings without the need to manage multiple devices or interfaces.

The data collection unit also is configured to take data from public and private CCTV, public systems, law enforcement and emergency service, social media, news report about a current event, and feed to the signal alert unit.

Enhancing the coverage of surroundings, the personal safety system includes a compact personal drone system. This aerial gadget boasts a high-resolution camera and microphone, gathering high-quality visual and audio data. The drone's compact and lightweight design-no more than 2"×2"×2" in size and 500 grams in weight—makes it easily portable. It can be stationed or detached and then stationed on the user's car, wearable device, or shoulder when not in use. Together with the wearable device, the drone can extend the range and provide unique vantage points to improve the user's understanding of their environment, significantly enhancing their situational awareness. The drone and wearable device can share real-time information to provide users with the most relevant and up-to-date information about their environment.

Figure 10:
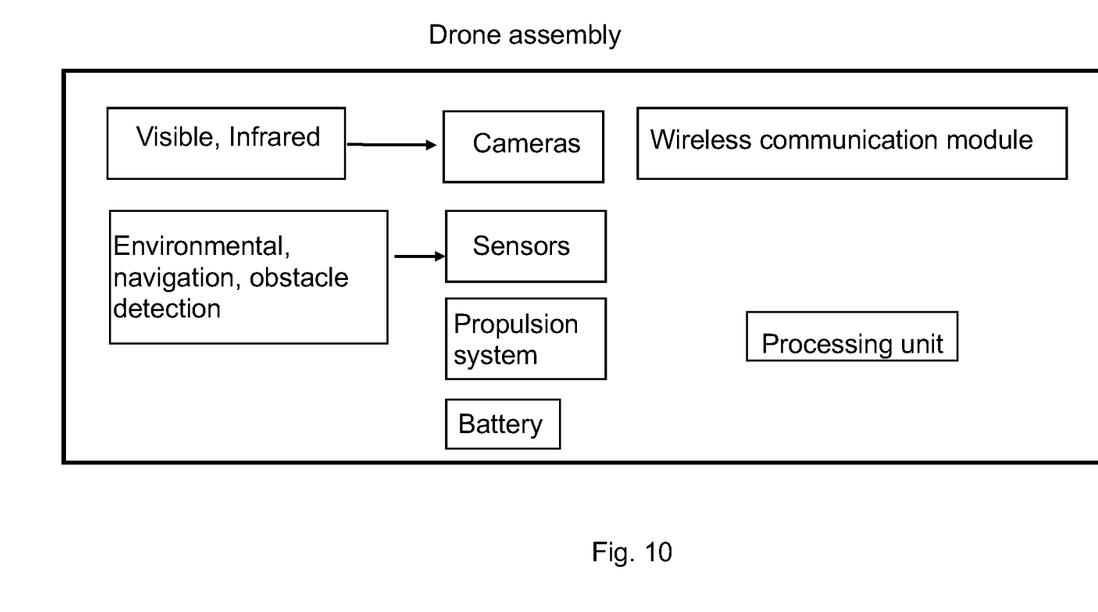
FIG. 10 is a schematic illustration of the components of drone assembly of the real-time personal safety system in accordance with the aspects of the present invention.

Referring to FIG. 10, the compact drone system comprises cameras, sensors, propulsion system, processing unit, a wireless communication module and a battery.

The drone's cameras and sensors play a critical role in data acquisition. These include imaging sensors for capturing visual information from the surrounding environment, infrared sensors for detecting heat signatures, and LiDAR sensors for measuring distances and mapping the environment in 3D. The drone's sensors may also include accelerometers, gyroscopes, and compasses to determine its orientation and motion, and GPS modules for precise geolocation.

The propulsion system of the drone allows for vertical takeoff and landing (VTOL) as well as precise maneuverability in various environments. The drone may be equipped with multiple rotors to ensure stability and agility during flight.

The drone's processing unit is tasked with real-time data analysis and decision-making. Equipped with advanced AI algorithms, this unit can analyze the data collected by the cameras and sensors to identify potential hazards, detect anomalies, and predict future hazards. It is also responsible for the drone's flight control, managing the propulsion system based on the user's commands and the drone's autonomous decision-making.

The wireless communication module enables the drone to communicate with the wearable device, the user's smartphone, or other devices. It can transmit the data collected by the drone to these devices for further analysis and decision-making, and can also receive commands and updates from these devices.

The drone's battery powers all of its systems and components. It is designed to be lightweight yet capable of providing sufficient power for prolonged operation. The battery may also be rechargeable, allowing the drone to be recharged when docked on the wearable device or through a separate charging unit.

Together, these components enable the compact drone to serve as an advanced personal information system, enhancing the user's situational awareness and safety by providing valuable real-time information about their environment.

The data collection unit comprises a plurality of sensors to monitor the user's environment, including potential hazards and physiological signals. These sensors, pivotal in enhancing an individual's personal security, provide continuous monitoring of the surroundings when the user traverses unfamiliar or potentially unsafe areas. The system is capable of recognizing potential threats, such as approaching strangers or hazardous objects. If a potential threat is detected, the system can alert the user through a connected device, like a smartphone or smartwatch. Moreover, during outdoor adventures, these sensors capture scenic views and provide information about the terrain, weather conditions, and potential hazards to augment the user's outdoor experience.

Beyond the user's immediate vicinity, the data collection unit is configured to gather broader situational information from public systems, such as traffic lights, data from law enforcement and emergency services, information from social media, news reports, and public and private CCTV. This provides a more comprehensive awareness of the surroundings and the overall context within which the user is operating, ensuring the system can provide alerts that are relevant to both the immediate and wider environment.

Figure 3:
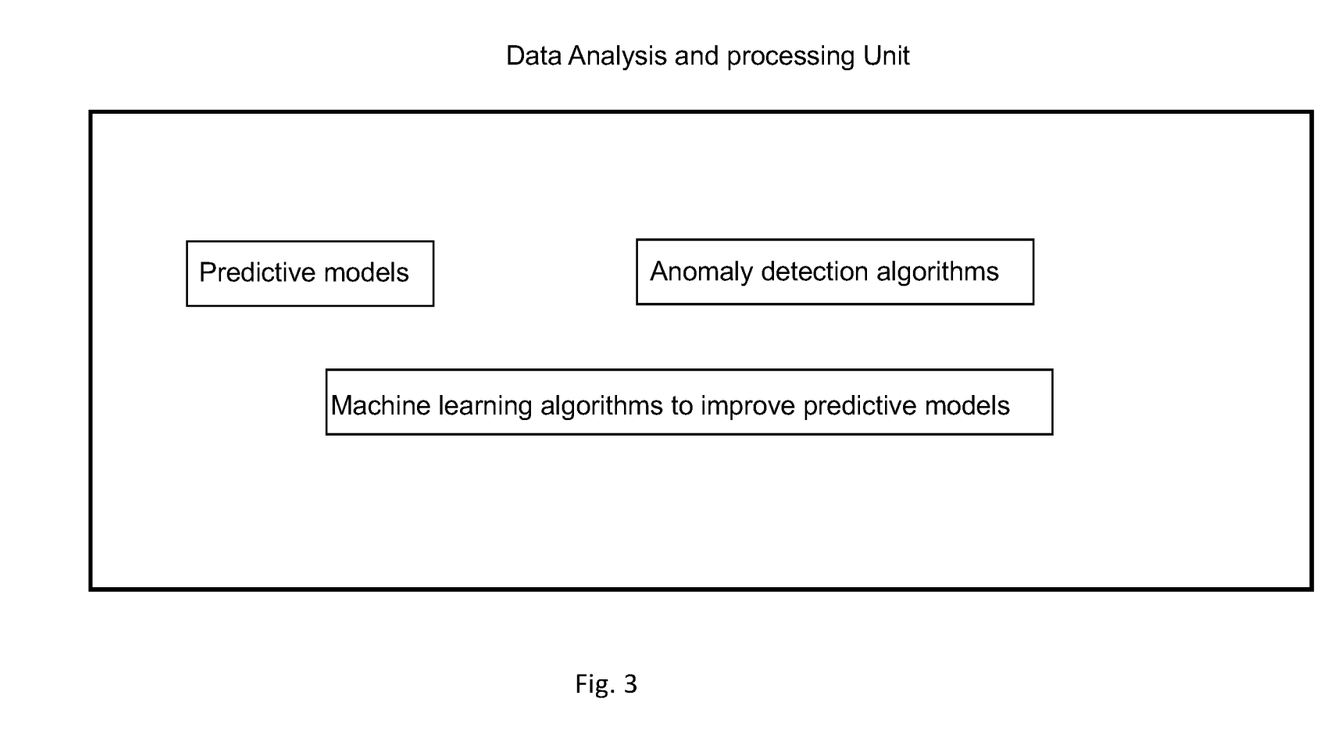
FIG. 3 is a schematic illustration of the components of the data analysis and processing unit of the real-time personal safety system in accordance with the aspects of the present invention.

The gathered data is transmitted to the data analysis and processing unit through wireless communication modules, enabling real-time communication with cloud-based services, the wearable device, and the user. This unit comprises a processor that executes the task of estimating the likelihood of various types of hazards based on the current condition information from the data collection unit. It provides a prediction and detects anomaly conditions by identifying unusual patterns of behavior, such as a drunk driver, a person in distress, a tree about to fall, traffic patterns, approaching foreign objects, etc.

The data gathered by the system is transmitted through wireless communication modules to a dedicated data analysis and processing unit. This unit enables real-time communication with the wearable device, cloud-based services, and the user, significantly enhancing the system's responsiveness.

The core of this unit is a powerful processor designed to analyze the incoming data stream and estimate potential hazards. This processor utilizes a combination of predictive models, anomaly detection algorithms, and machine learning algorithms to assess current conditions, identify anomalies, and forecast potential threats.

Predictive models, in one embodiment, fortified by statistical techniques and algorithms, analyze the present data in context with historical facts to predict future outcomes. In the realm of our integrated personal safety system, such models could estimate the likelihood of hazards based on current environmental conditions, nearby activities, and the status of the user's vehicle or personal drone. For instance, on a windy day with tall trees in the vicinity, the system could anticipate an increased risk of a tree falling.

Anomaly detection algorithms, in another embodiment, identify deviations from established normal behaviors within a given dataset. These detected patterns, known as anomalies or outliers, could be indicative of potential hazards. For instance, an erratically swerving nearby vehicle might signify a drunk or distracted driver, which the system could flag as an anomaly. Similarly, a tree swaying excessively in the wind might be an anomaly pointing to a potential risk of it falling.

Machine learning algorithms, in another embodiment, a form of artificial intelligence (AI), enable the system to learn and evolve from data rather than rely on explicit programming. Within our system, these algorithms continuously refine the predictive models based on past prediction outcomes. This process, known as supervised learning, leverages instances of correctly predicted hazards to improve future predictions. The system's ability to "learn" from past experiences enhances its accuracy and reliability over time.

Predictive models, anomaly detection algorithms, machine learning algorithms can be used independently or synergistically to analyze real-time data, pinpoint potential hazards, and predict future threats. This enables the system to promptly warn and guide the user, significantly improving their safety and situational awareness.

Figure 8:
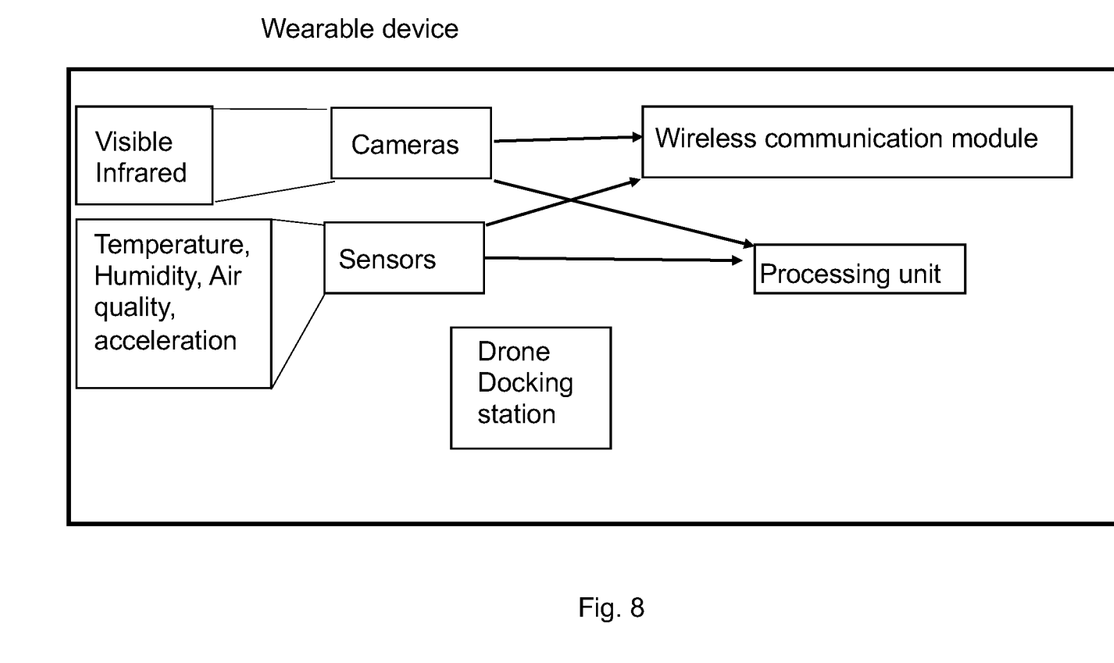
FIG. 8 is a schematic illustration of the components of one embodiment of the wearable device of the real-time personal safety system in accordance with the aspects of the present invention.

Referring to FIG. 8, specifically, in one embodiment, the cameras, sensors, wireless communication module and processing unit are all located in wearable device, so that information transmission does not involve an external network, which ensures reliability.

Figure 9:
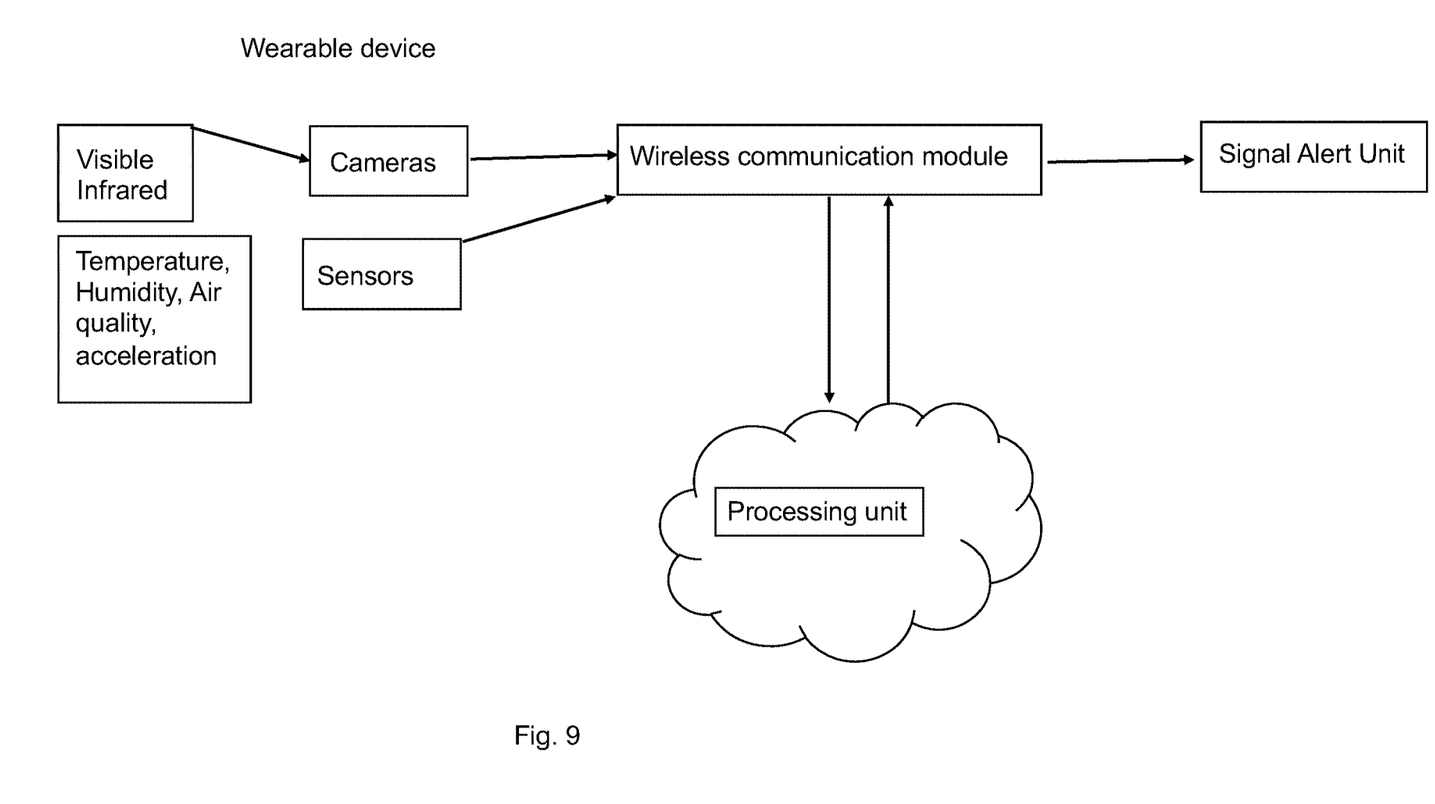
FIG. 9 is a schematic illustration of the components of another embodiment of the wearable device of the real-time personal safety system in accordance with the aspects of the present invention.

Referring to FIG. 9, alternatively, in another embodiment, the cameras, sensors, and wireless communication module unit are all located in wearable device, whereas processing unit is located in a remote cloud service so that portable wearable device is light weight and sophisticated analysis, and calculation can be carried out at the cloud service.

Furthermore, in the embodiment where integrated personal safety system features wireless communication modules to enable real-time communication with cloud-based services, the wearable device, and the user, more assistant decision-making tools can be provided to a user in time-sensitive situations, such as in an shocking unfamiliar, unsafe environment where prompt alerts of approaching strangers or hazardous objects could significantly enhance the user's personal safety. In addition, these wireless communication modules facilitate seamless sharing of real-time navigation assistance during outdoor adventures, helping the user stay on track and avoid getting lost.

These assessments and predictions are continuously improved as the system learns from the outcomes of past predictions, ensuring the evolution of the system's predictive capabilities over time.

Figure 5:
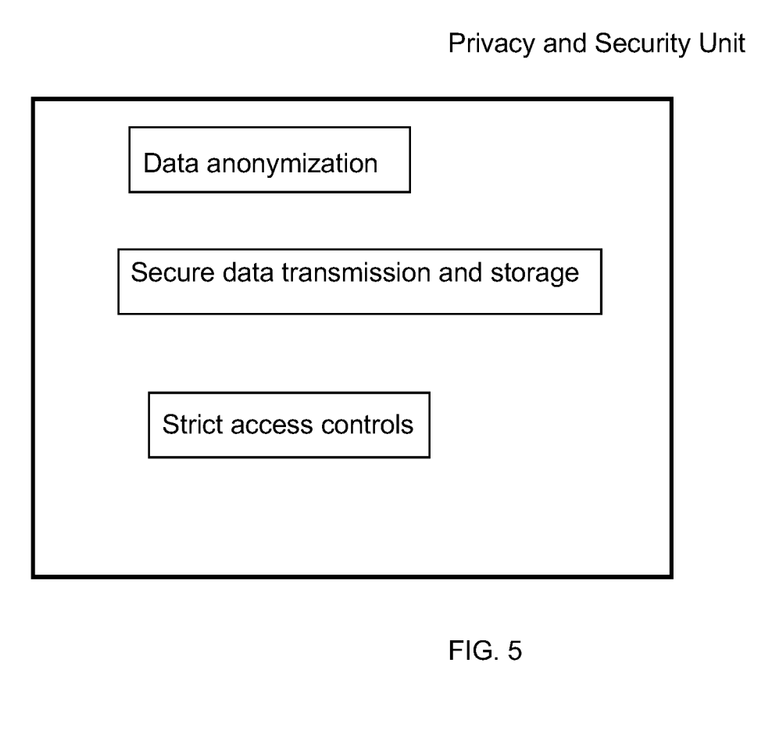
FIG. 5 is a schematic illustration of the components of the privacy and security unit of the real-time personal safety system in accordance with the aspects of the present invention.

To protect the privacy and security of the user, the system includes a privacy and security unit. This ensures strict privacy and security measures, including data anonymization, secure data transmission and storage, and strict access controls, upholding the user's trust in the system's operations.

Figure 4:
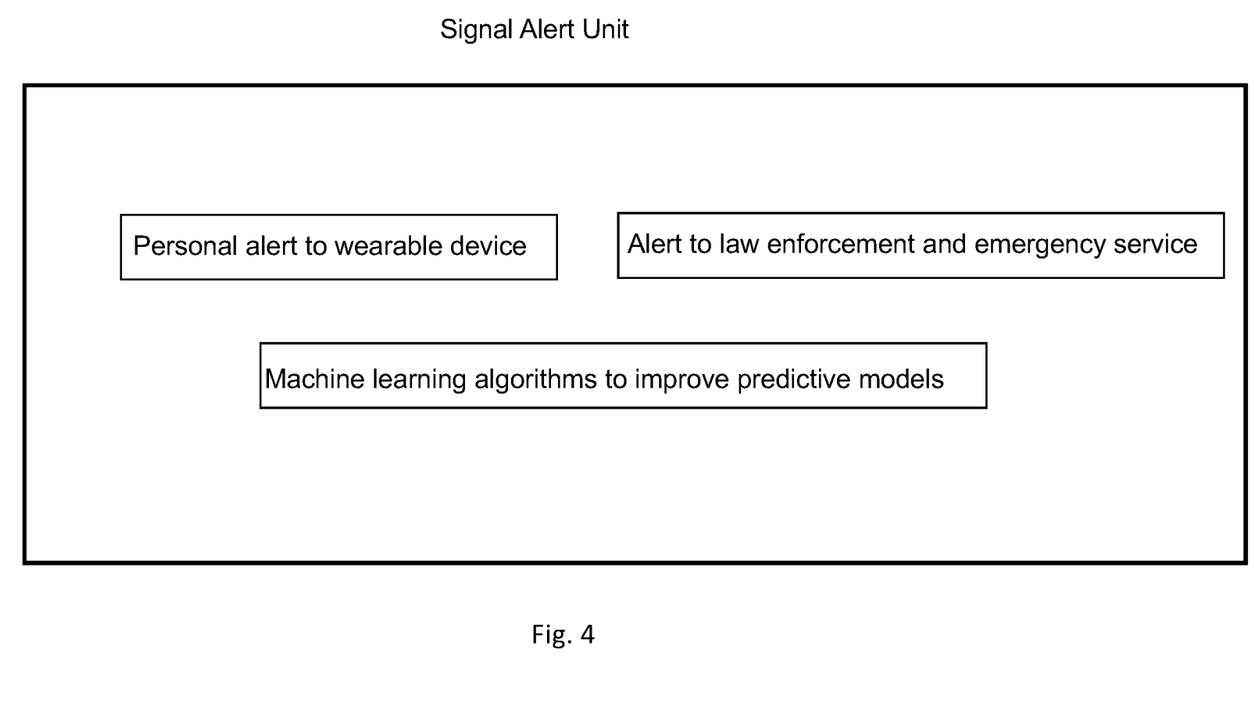
FIG. 4 is a schematic illustration of the components of the signal alert unit of the real-time personal safety system in accordance with the aspects of the present invention.

Once the processing unit analyzes the data and identifies a potential hazard, the information is sent to the signal alert unit. This unit selectively notifies the user of information based on predetermined criteria, such as proximity, urgency, relevance, or personal preferences. In addition to providing alerts to the individual user, the signal alert unit is configured to communicate with other integrated personal safety systems' signal alert units, sharing relevant data and alerts with other users.

The system also incorporates a vehicle telematics system, collecting data about the user's driving behavior and vehicle status. This includes an advanced autopilot alert system, which warns the user of potential hazards that the vehicle's autopilot system might not recognize or respond to appropriately. Additionally, the system integrates with public systems, law enforcement, and emergency services to provide timely and comprehensive alerts about potential hazards.

Notably, the wearable device includes a built-in GPS module for real-time tracking of the user's location, which is crucial for relevant and location-based alerts. Moreover, the system is designed with a user feedback mechanism that allows users to improve the predictive models and alert protocols based on their feedback. This feedback can include the accuracy and helpfulness of the alert, providing valuable data to refine the system's predictive models and alerting protocols.

Figure 6:
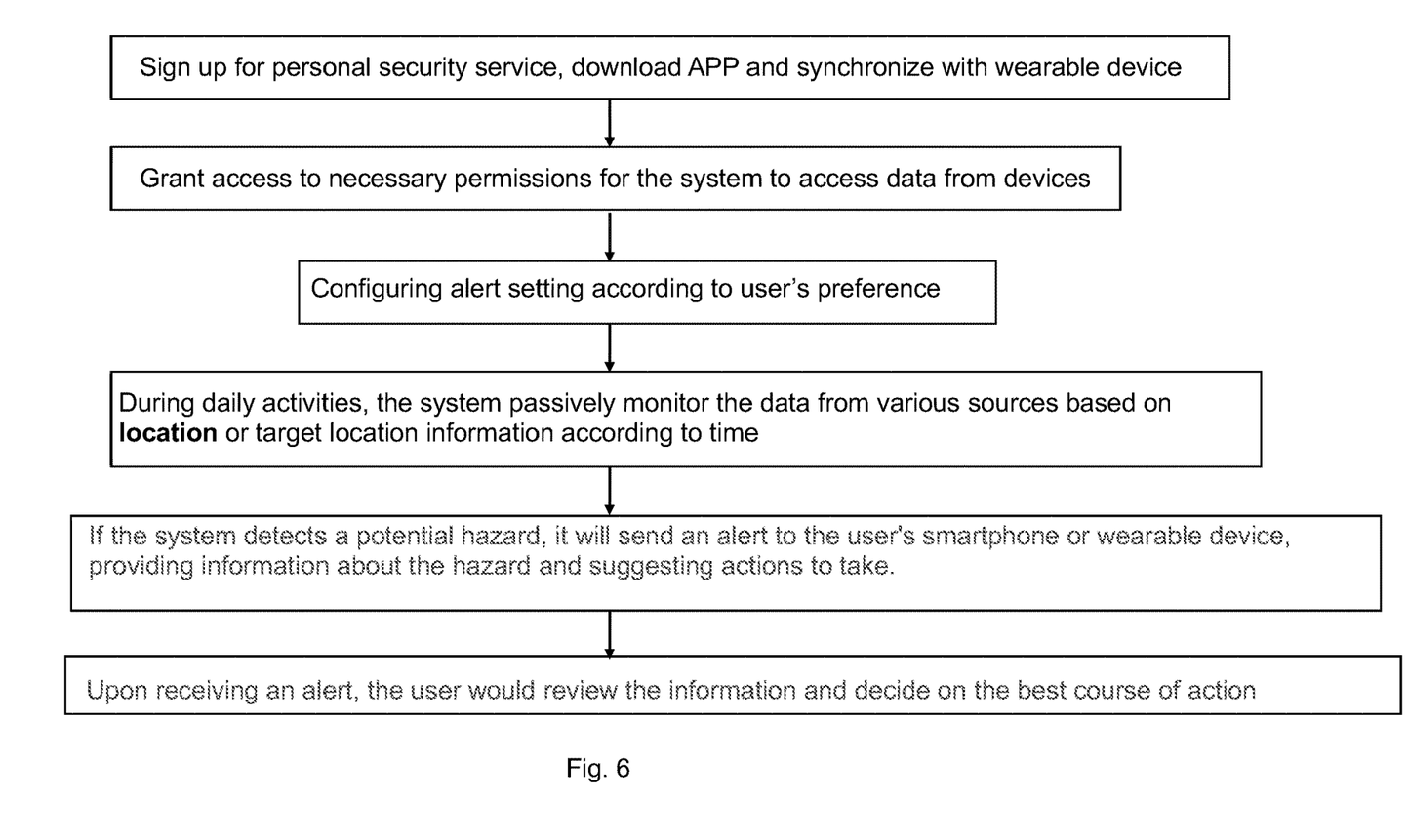
FIG. 6 and FIG. 7 combined is a flow diagram of embodiment of method of using of the real-time personal safety system in accordance with the aspects of the present invention.
Figure 7:
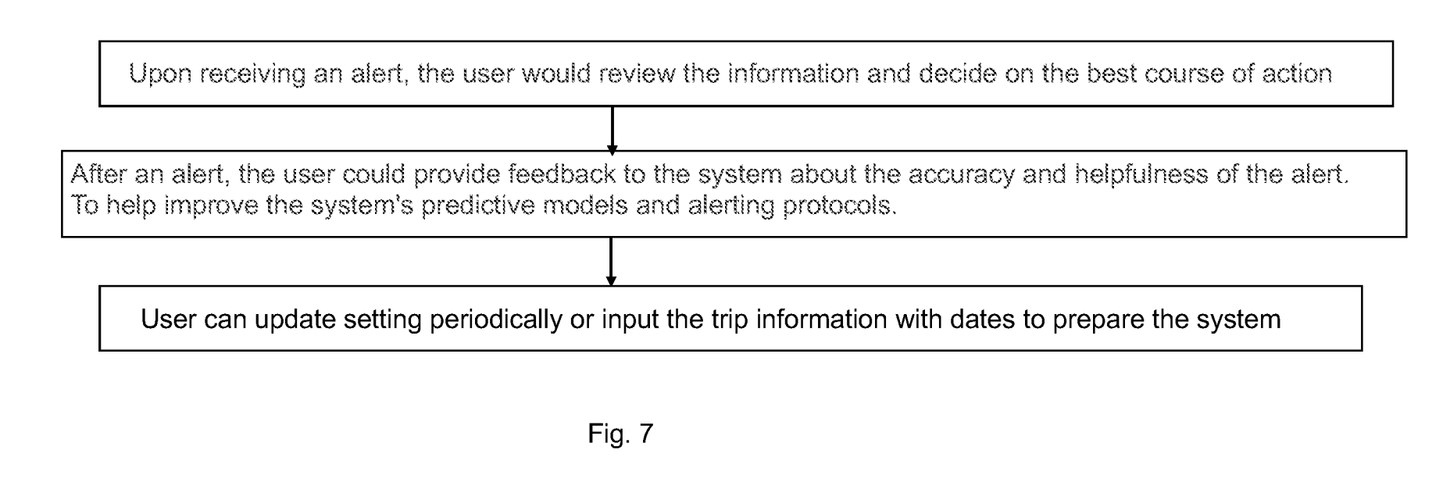

The personal safety system is meant to be seamlessly integrated into the user's everyday life. After signing up for the personal security service and downloading the associated app, the user can synchronize their wearable device and grant necessary permissions for the system to access data from their devices. They can also configure alert settings according to their preference, and the system passively monitors data from various sources based on location or target location information over time. Upon detecting a potential hazard, the system will send an alert to the user's smartphone or wearable device, provide information about the hazard, and suggest actions to take.

The system collects image and sound information using the drone and wearable device, then sends this data to a cloud service for processing. This central processing allows for a more powerful analysis than could be achieved on the device alone and ensures that users have access to the most comprehensive safety information possible. This real-time, cloud-based processing is a crucial aspect of the system's ability to provide prompt alerts and effectively enhance personal safety.

On another aspect of the invention, it is disclosed a method of using the integrated personal safety device. In one embodiment, the integrated personal safety device is used by a ordinary personal in an everyday life.

In another embodiment, the integrated personal safety device is used by a first responder.

Situation Assessment:
  a. Deploy the wearable device as the first responder enters the disaster zone.
  b. The device's sensors and multi-spectral cameras continuously monitor and collect data about the environment, including structural stability, potential hazards, temperature, and potential gas leaks.
  c. The onboard data analysis unit uses predictive models and anomaly detection algorithms to analyze this data in real-time.
  d. The system provides the first responder with insights and recommendations based on this analysis, aiding in decision-making and ensuring personal safety.

Locating Victims:
  a. If the disaster is large-scale, such as an earthquake, deploy the integrated drone for an aerial survey of the affected area.

b. The drone uses its thermal imaging cameras to locate heat signatures, identifying trapped victims beneath debris or in inaccessible areas.
c. This data is sent back to the wearable device, providing crucial information that can be used to prioritize rescue efforts.

Pathfinding and Navigation:
a. The wearable device and the drone work together to identify the safest and quickest routes across the disaster-stricken terrain.
b. Real-time geolocation tracking, and dynamic navigation guidance are provided by the system, ensuring the first responder stays on the safest path.
c. This route data is continuously updated based on the real-time analysis of the environment, helping the first responder avoid newly emerging hazards.

Communication:
a. The wearable device serves as a communication tool, allowing the first responder to exchange crucial information with the command center or other team members.
b. The device can transmit live feeds from the drone's camera, along with the other collected data, to aid in strategizing the overall response effort.

Through these steps, the wearable device and integrated drone enhance safety and situational awareness for the first responder, while also increasing the efficiency and effectiveness of the disaster response operation.

Implementation

As the wearable device is intended to be worn on various parts of the body, it is inherently subject to the dynamic and unpredictable movement of the wearer. This constant motion can potentially disrupt the intended orientation of the cameras and sensors, thereby affecting the accuracy of data capture and analysis. The challenge lies in maintaining the proper orientation of these components to ensure reliable environmental surveillance, regardless of the wearer's movement.

To address this, inventors have incorporated a sophisticated multi-axis gimbal system into the wearable device's design. This system allows the cameras and sensors to independently adjust their orientations in real-time, maintaining their focus on the intended field of view irrespective of how the device itself moves or is positioned. For instance, if the wearer turns their head or bends their body, the multi-axis gimbal system ensures that the cameras and sensors remain stable and correctly oriented.

A key aspect of this self-adjustment mechanism involves the use of a horizon detection algorithm. The cameras capture the skyline or horizon as a reference point and use it to continually self-correct their orientation. The cameras scan the environment, identify the skyline, and then adjust their tilt and pan to maintain alignment with this reference. By doing so, the cameras can always maintain a consistent and optimal field of view. This approach effectively mitigates the impact of body movement on the device's surveillance capability, ensuring accurate data capture and real-time threat detection.

This adaptive and self-correcting design significantly improves the device's robustness and reliability in diverse usage scenarios, enhancing its ability to provide reliable situational awareness and safety alerts for the wearer.

The role of artificial intelligence (AI) in our wearable device extends beyond basic data processing—it is central to the system's ability to accurately assess, predict, and respond to potential risks and hazards. AI algorithms are incorporated into the device's data processing unit, where they interpret the vast amounts of data collected by the cameras and sensors. This data could range from environmental conditions to visual imagery, and it is the job of the AI to translate this raw data into meaningful insights about the user's surroundings.

The use of AI in image analysis is particularly critical. The device's cameras continuously capture visual data from the environment, which is processed in real-time using advanced AI-powered image recognition algorithms. These algorithms can identify and classify a myriad of objects and situations, from recognizing unfamiliar entities to detecting potential obstacles or threats. By training these AI algorithms on vast datasets, the system can accurately recognize a wide range of entities and scenarios, thereby enhancing its threat detection capabilities.

Another significant aspect of AI in our system is predictive analytics. By analyzing the collected data and the user's patterns of behavior, the AI can make informed predictions about potential risks. For instance, if the AI detects that the user is heading towards a busy intersection, it can predict the increased risk of traffic-related incidents and send an alert or recommendation accordingly.

Moreover, the use of AI enables the system to learn and adapt over time. Through machine learning, the device can continuously refine its algorithms based on new data and experiences. This adaptive learning process enables the system to become more accurate and reliable in its assessments and predictions over time, enhancing its overall effectiveness in promoting user safety.

In summary, the integration of AI significantly augments the capabilities of the wearable device. It not only enhances the device's ability to interpret environmental data and detect threats but also enables it to predict potential hazards and adapt to the user's behavior and environment. This intelligence-driven approach is key to the device's ability to provide real-time, data-driven safety alerts and recommendations.

Application Case 1: Personal Security and Safety Enhancement

In this application scenario, the integrated personal information system and compact drone facilitate heightened personal security and safety. The user adorns this innovative system, seamlessly amalgamated into a wearable accessory such as a hat, belt, or necklace.

As the user traverses unfamiliar or potentially high-risk areas, the wearable device's embedded sensors and multi-spectral cameras perpetually surveil the environment. The data processing unit conducts real-time analysis of the gathered data, identifying potential threats such as approaching unfamiliar entities or hazardous obstacles. Upon threat detection, the system triggers an alert on a connected device, like a smartphone or smartwatch, warning the user promptly.

Should the user perceive a heightened sense of danger or desire amplified comprehension of their surroundings, the integrated personal compact drone can be deployed. From its docking position on the wearable device, the drone elevates above the user to provide an aerial perspective of the immediate vicinity. The drone's sophisticated camera and sensor array collate additional data, pinpointing potential escape routes or monitoring suspicious individuals from a secure distance. This intelligence is transmitted to the wearable device for data processing, generating necessary alerts for the user.

Application Case 2: Outdoor Adventure Navigation Support

This application scenario employs the integrated personal information system and compact drone to augment an individual's outdoor adventure and navigation experience. The user dons the system, harmoniously integrated into an accessory such as a backpack, hat, or wristband.

During outdoor activities like hiking, biking, or exploration, the wearable device's sensors and cameras persistently monitor the surroundings. They capture panoramic views and gather data about the terrain, weather conditions, and potential hazards. The system also maintains real-time geolocation tracking of the user, interfacing with cloud-based services to provide dynamic navigation guidance, ensuring the user remains on the planned course and avoids straying.

When the user confronts a challenging or unfamiliar segment of the trail, the integrated personal drone can be dispatched to scout the region ahead. The drone, launched from its docking position on the wearable device, proceeds forward to yield an aerial reconnaissance of the terrain, deducing the optimal route, or detecting concealed obstacles or hazards. The obtained data is relayed back to the wearable device, where it's processed to provide the user with directives on the best course of action.

Application Case 3: Disaster Response and Emergency Management

In this application, the amalgamation of the wearable device and the integrated drone has a potent role to play for first responders during critical incidents such as natural disasters, fires, or other emergencies. Here's an illustration of its potential functionalities:

Situation Assessment: Upon entry into a disaster-stricken area, the wearable device's sensors and multi-spectral cameras persistently survey the environment, gathering data on factors such as structural stability, potential hazards, temperature fluctuations, and potential gas leaks. By analyzing this data in real-time using predictive models and anomaly detection algorithms, the system can provide crucial insights for the first responder to make informed decisions and ensure personal safety.

Locating Victims: In large-scale disasters such as earthquakes, the integrated drone can be dispatched for an immediate aerial survey of the affected area. Equipped with thermal imaging cameras, the drone can detect heat signatures of victims trapped beneath debris or situated in inaccessible areas, effectively assisting in prioritizing rescue missions.

Pathfinding and Navigation: The wearable device, working in tandem with the drone, can aid in identifying the quickest and safest routes across the calamity-ridden terrain, evading obstacles and hazards. Real-time geolocation tracking and dynamic navigation guidance provided by the system ensure that the first responder stays on the safest path.

Communication: In addition, the system can function as a communication tool, enabling the first responder to exchange crucial information with the command center or other team members. It can transmit live feeds from the drone's camera and other gathered data, contributing to strategizing the comprehensive response effort.

In such critical applications, the collaborative action of the wearable device and the drone not only escalates the safety measures for the first responder but also markedly enhances the efficiency and effectiveness of disaster management operations.

In all application scenarios, the integrated personal information system and compact drone collaborate to augment the user's situational awareness, enhance safety, and deliver real-time assistance tailored to their specific needs and activities.

The invention claimed is:

1. An integrated real-time personal safety system for a user, comprising:
    [a] a data collection unit, configured to gather real-time user's current condition information including both said user's environment and physiological signals, from multiple sources, comprising
        a wearable device embedded with a plurality of multi-spectral cameras capturing real-time data in various spectral bands;
    [b] a set of sensors for monitoring the user's environment and physiological signals;
    [c] wireless communication modules to enable real-time communication with cloud-based services, the wearable device, and the user; and
    [d] a data analysis and processing unit to analyze the gathered data, predict potential hazards, and alert the user accordingly, through a signal alert unit;
    a compact personal drone system for aerial information gathering and enhancing coverage of surroundings, comprising a high-resolution camera and microphone to gather high-quality visual and audio data,
    wherein the drone is being stationed or detached and then stationed on the user's car, wearable device, or shoulder when not in use,
    wherein the data collection unit is configured to further gather current condition information from public system including traffic lights, data from law enforcement and emergency service, information from social medial, news reports and public and private CCTV.

2. The integrated personal safety system of claim 1, wherein the data analysis and processing unit comprises a processor, executing the steps of
    a. estimating a likelihood of various types of hazards based on current condition information from the data collection unit, and provide a prediction;
    b. detecting anomaly conditions by identifying unusual patterns of behavior that can indicate a drunk driver, a person in distress, or a tree about to fall, traffic patterns, approaching foreign objects, based on image and video process and analysis;
    c. continuously improving the predictive models based on outcomes of a past prediction.

3. The integrated personal safety system of claim 1, further comprises a privacy and security unit providing strict privacy and security measures including data anonymization, secure data transmission and storage, and strict access controls.

4. The integrated personal safety system of claim 1, wherein the wearable device is incorporated into various wearable items, including hats, glasses, watches, bags, belts, clothing items, and jewelry.

5. The integrated personal safety system of claim 1, wherein the plurality of cameras provide 360-degree coverage of the user's surroundings, with night vision and imaging.

6. The integrated personal safety system of claim 1, wherein the set of sensors are biometric sensors, including, temperature sensors, humidity sensors, air quality sensors for either current location and target location, and environmental sensors, including motion sensors, heart rate, and blood oxygen level sensors for the user.

7. The integrated personal safety system of claim 1, wherein the drone is compact and lightweight for easy portability, with a size less than 2"×2"×2" and a weight less than 500 grams, integratable with the wearable device.

8. The integrated personal safety system of claim 1, wherein image and sound information are collected and sent to a cloud service before being processed and processing unit is located at the cloud service.

9. The integrated personal safety system of claim 1, wherein the signal alert unit is configured to selectively notify the user of information based on predetermined criteria, such as proximity, urgency, relevance, or personal preferences.

10. The integrated personal safety system of claim 1, wherein the signal alert unit is configured to communicate with another integrated personal safety systems' signal alert unit, sharing relevant data and alerts with another user.

11. The integrated personal safety system of claim 1, further comprising a vehicle telematics system for collecting data about the user's driving behavior and vehicle status and providing alerts and interventions for safer driving.

12. The integrated personal safety system of claim 1, further comprising an advanced autopilot alert system to warn the user of potential hazards that the vehicle's autopilot system cannot recognize or respond to appropriately.

13. The integrated personal safety system of claim 1, wherein the system integrates with public systems, law enforcement, and emergency services to provide timely and comprehensive alerts about potential hazards.

14. The integrated personal safety system of claim 1, wherein the system includes a user feedback mechanism to improve the predictive models and alert protocols based on the user's feedback.

15. The integrated personal safety system of claim 1, wherein the wearable device includes a built-in GPS module for real-time tracking of the user's location.

16. A method of using the personal safety system, comprising
   a. providing an integrated personal safety system of claim 1;
   b. signing up for a personal security service, downloading an APP and synchronizing with a wearable device;
   c. granting access to necessary permissions for the system to access data from devices;
   d. configuring alert setting according to user's preference;
   e. passively monitoring a data from various sources based on location or target location information according to time, during daily activities;
   f. detecting a potential hazard, it will send an alert to the user's smartphone or wearable device;
   g. providing information about the hazard and suggesting actions to take to the user; and
   h. reviewing the information and decide on the best course of action.

17. The method of claim 16, further comprising
   providing feedback to the system about the accuracy and helpfulness of the alert, to help improve the system's predictive models and alerting protocols; and
   update setting periodically or input the trip information with dates to prepare the system.

18. A method of using a personal safety system in a disaster zone, comprising
   assessing situation of the disaster zone through the personal safety system;
   locating victims through the personal safety system;
   finding path and navigating through the personal safety system; and
   communicating between a first responder and a command center through the personal safety system,
   wherein
      a step of assessing situation of the disaster zone through the personal safety system, comprising:
         a. deploying a wearable device as a first responder entering the disaster zone;
         b. monitoring and collecting data about the disaster zone environment through a plurality of sensors and multi-spectral cameras of the wearable device, continuously, including structural stability, potential hazards, temperature, and potential gas leaks;
         c. using an onboard data analysis unit to generate predictive models and anomaly detection algorithms to analyze the monitored and collected data in real-time; and
         d. providing the first responder with insights and recommendations based on the data analysis, aiding in decision-making and ensuring personal safety of the first responder,
      a step of locating victims through the personal safety system, comprising:
         a. determining if a suitable size drone and deploying the suitable size of drone for an aerial survey of the disaster zone;
         b. using thermal imaging cameras on the suitable drone to locate heat signatures of the disaster zone, identifying trapped victims beneath debris or in inaccessible areas;
         c. sending heat signatures back to the wearable device, providing crucial information that can be used to prioritize rescue efforts;
      a step of finding path and navigating through the personal safety system, comprising:
         a. identifying safest and quickest routes across the disaster zone and establishing a route data;
         b. tracking real-time geolocation and providing dynamic navigation guidance by the personal safety system, ensuring the first responder stays on a safe path;
         c. updating continuously a route data based on the real-time analysis of the environment, helping the first responder avoid newly emerging hazards;
      a step of communicating between the first responder and a command center through the personal safety system, comprising:
         a. the wearable device serves as a communication tool, allowing the first responder to exchange crucial information with the command center or other team members,
         b. the device can transmit live feeds from the drone's camera, along with the other collected data, to aid in strategizing an overall response effort.

* * * * *